US006648004B2

United States Patent
Lau

(10) Patent No.: US 6,648,004 B2
(45) Date of Patent: Nov. 18, 2003

(54) AIR VALVE FOR INFLATABLE ARTICLE

(75) Inventor: Vincent Wai Shun Lau, Hong Kong (HK)

(73) Assignee: Pleasure Time Products (Hong Kong) Limited (HK)

( * ) Notice: Subject to any disclaimer, the term of this patent is extended or adjusted under 35 U.S.C. 154(b) by 0 days.

(21) Appl. No.: 09/784,460

(22) Filed: Feb. 15, 2001

(65) Prior Publication Data

US 2003/0075218 A1 Apr. 24, 2003

(51) Int. Cl.[7] ............................................. F16K 15/20
(52) U.S. Cl. ........................ 137/223; 137/232; 137/854
(58) Field of Search ............................ 137/223, 232, 137/522, 854; 446/224

(56) References Cited

U.S. PATENT DOCUMENTS

| 2,859,771 | A | * | 11/1958 | Blagg | 134/854 X |
| 3,018,790 | A | * | 1/1962 | Kimes | 137/854 X |
| 3,022,796 | A | * | 2/1962 | Cummings | 137/454.6 |
| 3,228,418 | A | * | 1/1966 | Rosback et al. | 137/854 X |
| 4,004,614 | A | * | 1/1977 | Mackal et al. | 137/232 X |
| 4,579,141 | A | * | 4/1986 | Arff | 137/223 |
| 4,749,003 | A | * | 6/1988 | Leason | 137/854 |
| 4,805,661 | A | * | 2/1989 | Knapp et al. | 137/854 X |
| 4,838,262 | A | * | 6/1989 | Katz | 137/854 X |
| 5,027,784 | A | * | 7/1991 | Osawa et al. | 137/854 X |
| 5,129,426 | A | * | 7/1992 | Boehmer | 137/854 |
| 5,203,831 | A | * | 4/1993 | Lind et al. | 137/223 X |
| 5,275,197 | A | * | 1/1994 | Finell | 137/223 X |
| 5,285,816 | A | * | 2/1994 | Herlihy | 137/856 |
| 5,343,889 | A | * | 9/1994 | Jaw | 137/232 |
| 5,860,449 | A | * | 1/1999 | Schulte | 137/854 X |
| 5,915,407 | A | * | 6/1999 | West | 137/223 |
| 5,971,723 | A | * | 10/1999 | Bolt et al. | 137/854 X |
| 5,992,462 | A | * | 11/1999 | Atkinson et al. | 137/854 |
| 6,135,143 | A | | 10/2000 | Po | |
| 6,138,711 | A | | 10/2000 | Lung-Po | |

* cited by examiner

*Primary Examiner*—John Rivell
(74) *Attorney, Agent, or Firm*—Raymond Sun

(57) ABSTRACT

An air valve assembly has a valve block that is permanently secured to an article and has a passageway through which air can pass. The assembly further includes a valve body made from a flexible material defining a through bore, and having a wall with an inner annular indent. The assembly also includes an air block made from a rigid material. The air block has an outer wall with a flange provided on the outer wall, and a plurality of air holes and a central passageway. The flange is fitted inside the indent to attach the air block to the valve body. The assembly also has a valve flap having a disk and a shaft, with the shaft inserted through the central passageway of the air block.

17 Claims, 4 Drawing Sheets

AIR VALVE FOR INFLATABLE ARTICLE

BACKGROUND OF THE INVENTION

1. Field of the Invention

The present invention relates to an air valve for use with an inflatable article, and in particular, to an air valve which provides a tight seal yet offers ease of use when inflating and deflating the article.

2. Description of the Prior Art

Regular inflatable articles, such as life buoys, splash pools, boats, and toys, among others, are commonly equipped with an air valve. The user inflates the article by pumping air from a pump (e.g., hand pump, foot pump, etc.) through the air valve into the interior of the article. To deflate the article for storage, the air is normally released via the air valve.

The function and effectiveness of the air valve is critical to the use and enjoyment of the article. For example, some of these articles are quite large (e.g., splash pools and boats) and therefore require a lot of air for inflation. Therefore, it can be very time-consuming to inflate, and deflate, such a large inflatable article. As another example, the air valve must be effective in preventing leaks.

Conventional and known air valves suffer from a number of drawbacks. One common drawback is that many of them are not effective in preventing leakage. This drawback can be attributed to a number of different reasons. First, the structure of the different components of the air valve can be such that leakage occurs between the components. Second, the materials used for these air valves may have become worn through extended use and therefore do not function as effectively in preventing leakage. Another common drawback is that some air valves have a very complicated structure which can render the air valve to be costly, or subject to malfunction (e.g., if one component malfunctions). Yet a further common drawback is that many air valves are not easy to use during inflation and deflation.

Thus, there still remains a need for an air valve that is easy to use, that is effective in preventing leakage, that has a simple construction, and which can be manufactured inexpensively.

SUMMARY OF THE DISCLOSURE

The objectives of the present invention can be accomplished by providing an air valve assembly having a valve block that is permanently secured to an article, the valve block having a passageway through which air can pass. The assembly further includes a valve body made from a flexible material, the valve body defining a through bore and having a wall with an inner annular indent. The assembly also includes an air block made from a rigid material. The air block has an outer wall with a flange provided on the outer wall, and a plurality of air holes and a central passageway. The flange is fitted inside the indent to attach the air block to the valve body. The assembly also has a valve flap having a disk and a shaft, the shaft having an enlarged tip, with the shaft inserted through the central passageway of the air block.

DETAILED DESCRIPTION OF THE PREFERRED EMBODIMENTS

Figure 1:
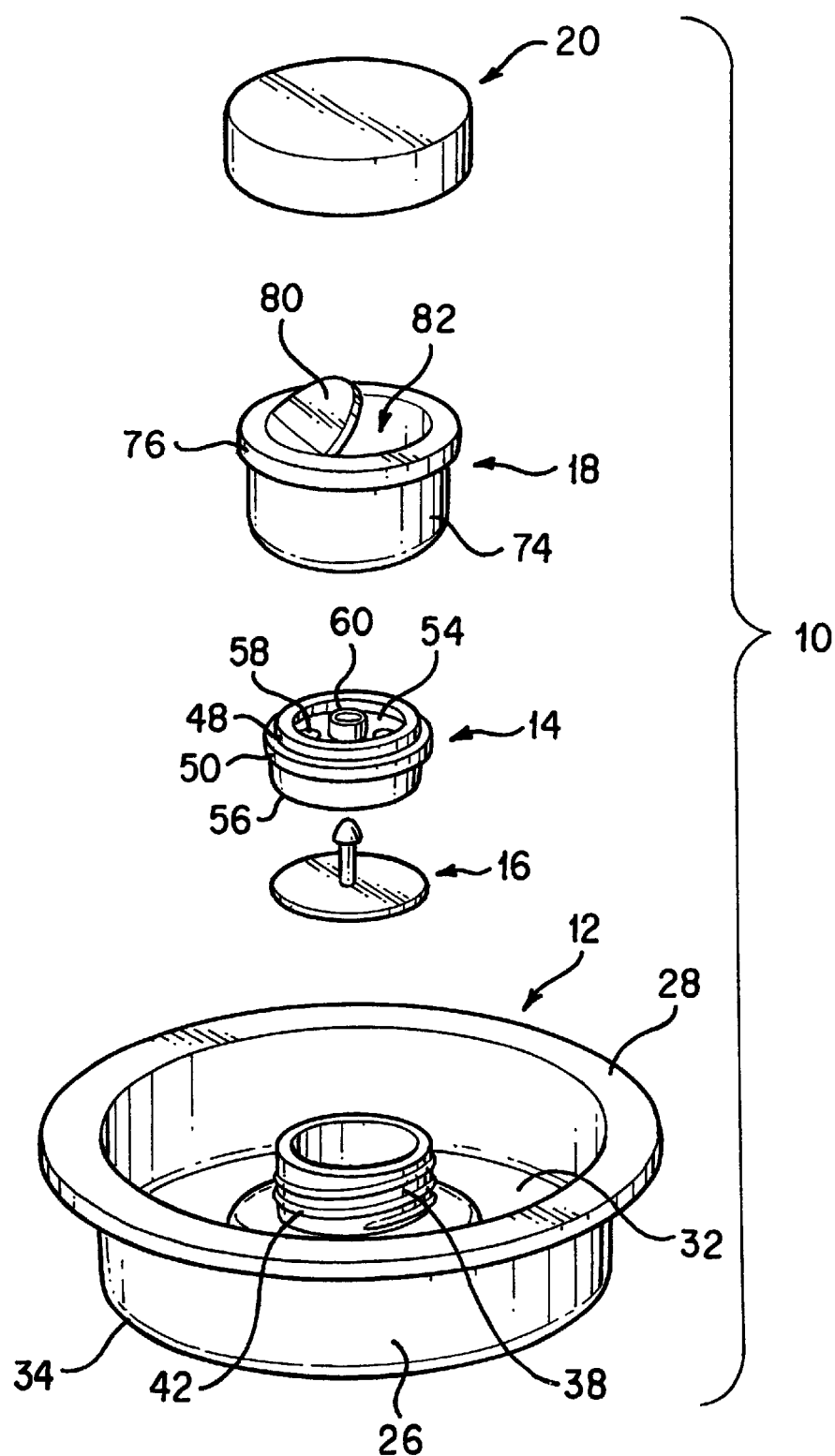
FIG. 1 is an exploded perspective view of an air valve assembly according to one embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

FIGS. 1–5 illustrate an air valve assembly 10 according to one embodiment of the present invention. The air valve assembly 10 includes the following major components: a valve block 12 that is secured to the wall of the inflatable article, an air block 14, a valve flap 16 that is operatively coupled to the air block 14, a valve body 18 which receives the air block 14, and a cap 20 which covers the assembly 10.

The valve block 12 has a generally cylindrical body 26 with an annular flange 28 that extends radially from the top edge 30 of the cylindrical body 26. The valve block 12 has a generally flat base 32 that is connected to the bottom 34 of the cylindrical body 26, with an opening 36 provided at about the center of the base 32. A cylindrical wall 38 extends from the base 30 around the opening 36, and is positioned inside the cylindrical body 26. The cylindrical wall 38 has a height that is preferably no higher than the height of the cylindrical body 26, and terminates slightly below the top edge 30 of the cylindrical body 26. The outer surface 40 of the wall 38 has a plurality of screw threads 42 provided thereon for engaging the internal screw threads 100 of the cap 20, as described below.

Figure 3:
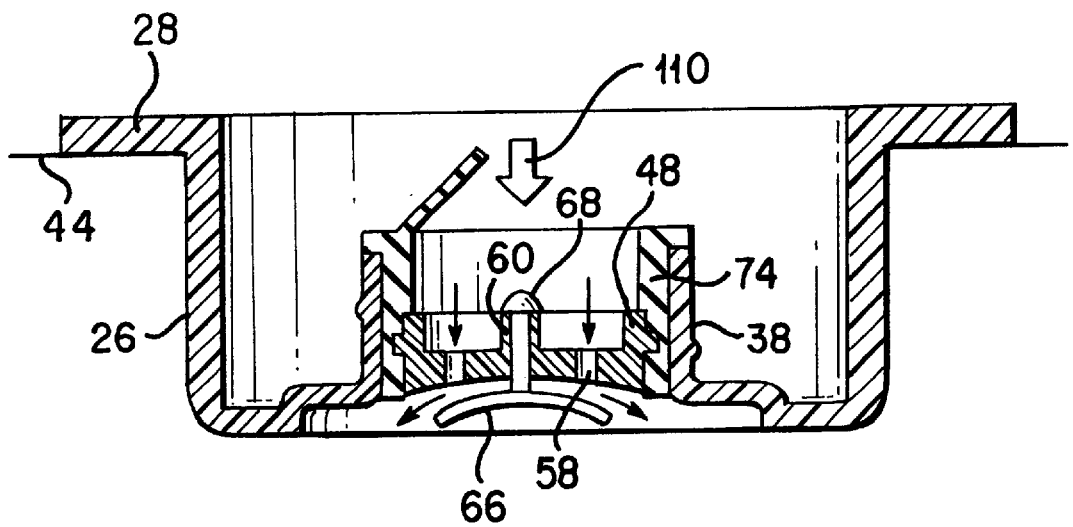
FIG. 3 is a cross-sectional view of the air valve assembly of FIG. 1 shown in use when inflating an inflatable article.
Figure 4:
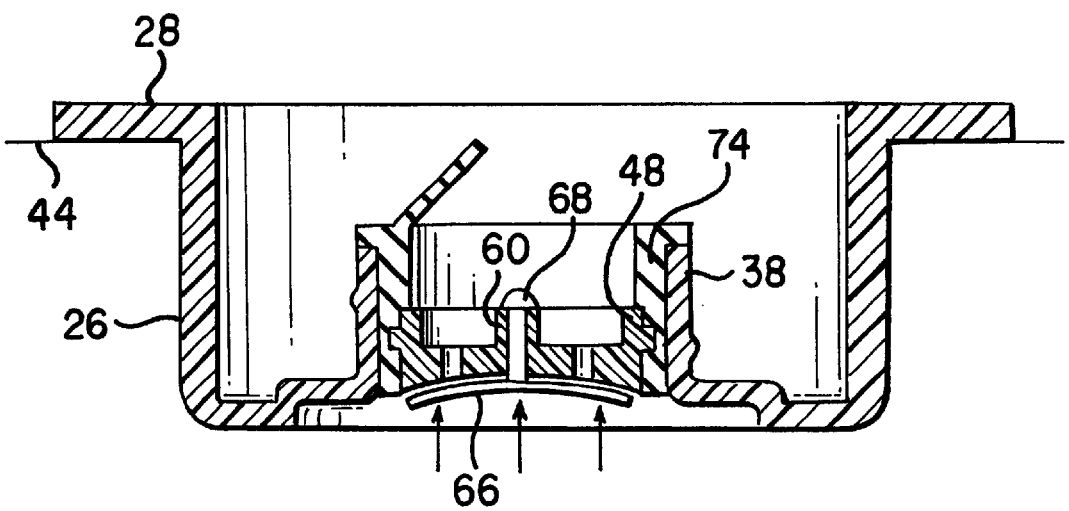
FIG. 4 is a cross-sectional view of the air valve assembly of FIG. 1 shown in use after the inflatable article has been inflated.

As shown in FIG. 3, the flange 28 is connected to an opening in the wall 44 of the inflatable article. This connection can be accomplished, for example, by welding the flange 28 to the wall 44 of the article. The valve block 12 can be made in one piece from a rigid or hard material. This material can include plastics such as polyethylene (PE), PVC, polypropylene (PP), ABS, and any similar plastic resin, among other materials.

The air block 14 has a generally cylindrical wall 48 with an annular flange 50 extending radially from the outer surface 52 of the wall 48. A generally convex disk 54 covers the interior of the cylindrical wall 48 adjacent the bottom edge 56 of the wall 48, and a plurality of air holes 58 can be provided in the disk 54 in a spaced-apart ring-like manner around a hollow central stem 60. An opening 62 extends through the central stem 60 and is adapted to receive the shaft 64 of the valve flap 16. The air block 14 is preferably made in one piece from a rigid or hard material. This material can include plastics such as polyethylene (PE), PVC, polypropylene (PP), and any similar plastic resin, among other materials.

The valve flap 16 has a generally circular disk 66 and a thin shaft 64 that extends perpendicularly and vertically from the disk 66. The shaft 64 is positioned at about the central axis of the disk 66, and has an enlarged tip 68 at its upper end. The enlarged tip 68 can be shaped as an arrowhead having a sharp tip and two tapered sides extending from the sharp tip, and two straight rear edges 69. The valve flap 16 is preferably formed in one piece from a flexible and soft material. This material can include rubber, and plastics such as polyethylene (PE), PVC, polypropylene (PP), EVA and any similar plastic resin, among other materials.

The valve body 18 has a generally cylindrical wall 74 with an annular flange 76 extending radially from the top edge 78 of the wall 74. A flap 80 extends at an angle from the top edge 78, and functions as a gripping handle for a user to grip when the user removes the valve body 18 from the valve block 12 (as described below). A through bore 82 extends through the valve body 18. A first annular indentation 84 is provided in the inner surface 86 of the wall 74, and a second annular indentation 88 extends from the first indentation 84 by a greater extent into the wall 74. The valve body 18 is preferably formed in one piece from a flexible and soft material. This material can include rubber, and plastics such as polyethylene (PE), PVC, polypropylene (PP), EVA and any similar plastic resin, among other materials.

The cap 20 can be a screw cap or lid having a top disk 96 and an annular flange 98 extending downwardly from the disk 96. Internal threads 100 can be provided on the inner surface 102 of the flange 98. The cap 20 is preferably sized and configured so that it can cover the cylindrical wall 38 of the valve block 12, with the threads 100 engaging the threads 42 on the cylindrical wall 38. The cap 20 is preferably formed in one piece from either a rigid or a soft flexible material. This material can include polyethylene (PE), PVC, polypropylene (PP), ABS, nylon, and any similar plastic resin, among other materials.

Figure 2:
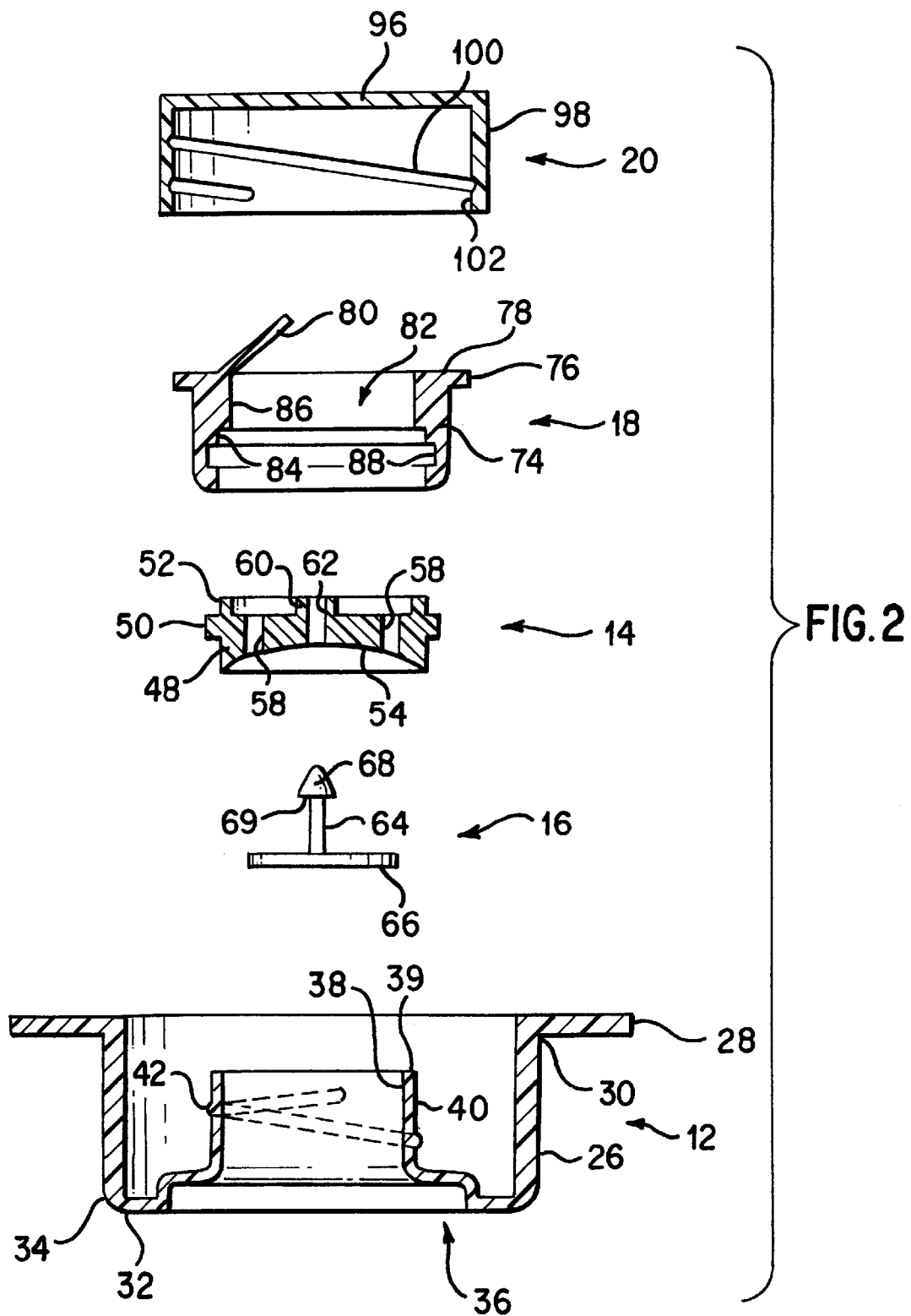
FIG. 2 is a cross-sectional perspective view of the air valve assembly of FIG. 1.

The air valve assembly 10 can be assembled in the following manner. Referring to FIGS. 1–3, the valve flap 16 is first attached to the air block 14. The valve flap 16 is attached to the air block 14 by inserting the shaft 64 through the opening 62 in the central stem 60, from the bottom of the air block 14 towards the top thereof. The tapered sides of the enlarged tip 68 allow the tip 68 (which has a larger size than the size of the opening 62) to be flexed and to be pushed through the opening 62. As shown in FIG. 3, the valve flap 16 is securely attached to the air block 14 when the entire enlarged tip 68 exits the opening 62 at the upper side of the stem 60. The straight lower edges 69 of the tip 68 abut against the top of the stem 60 to prevent the shaft 64 from being pulled back through the opening 62. The shaft 64 can be slightly shorter than the length of the opening 62, so that the valve flap 16 can be tightly retained by the stem 60.

At this time, the air block 14 is inserted through the through bore 82 of the valve body 18. The air block 14 is secured inside the through bore 82 when the flange 50 of the air block 14 is fitted inside the second indentation 88, and the upper part of the wall 48 of the air block 14 is fitted inside the first indentation 84, as shown in FIG. 3. The valve body 18 is then inserted into the interior of the wall 38 of the valve block 12, with the flange 76 of the valve body 18 extending over the top edge 39 of the wall 38. The cap 20 can then be threadably secured to the wall 38 by engaging the threads 42 and 100.

To inflate the article via the valve assembly 10, the cap 20 is threadably disengaged from the wall 38. A source of air (e.g., a pump) is then attached to the valve assembly 10 using well-known techniques so that air is introduced from the top of the valve body 18 (see direction of arrow 110). The air will be forced through the holes 58, and the pressure of the air will push aside the flexible disk 66 of the valve flap 16 to allow the air to enter the interior of the inflatable article via the opening 36 at the base 32 of the valve block 12. The convex contour of the disk 54 of the air block 14 makes it easier for the air to push aside the disk 66. When the article has been completely inflated, the air inside the article will push the flexible disk 66 of the valve flap 16 against the convex disk 54 in a direction opposite to the direction of arrow 110 so as to block the holes 58 and to prevent air from escaping from the interior of the article. The cap 20 can then be secured to the wall 38 to provide an additional safeguard against leakage of the air from the interior of the article.

Figure 5:
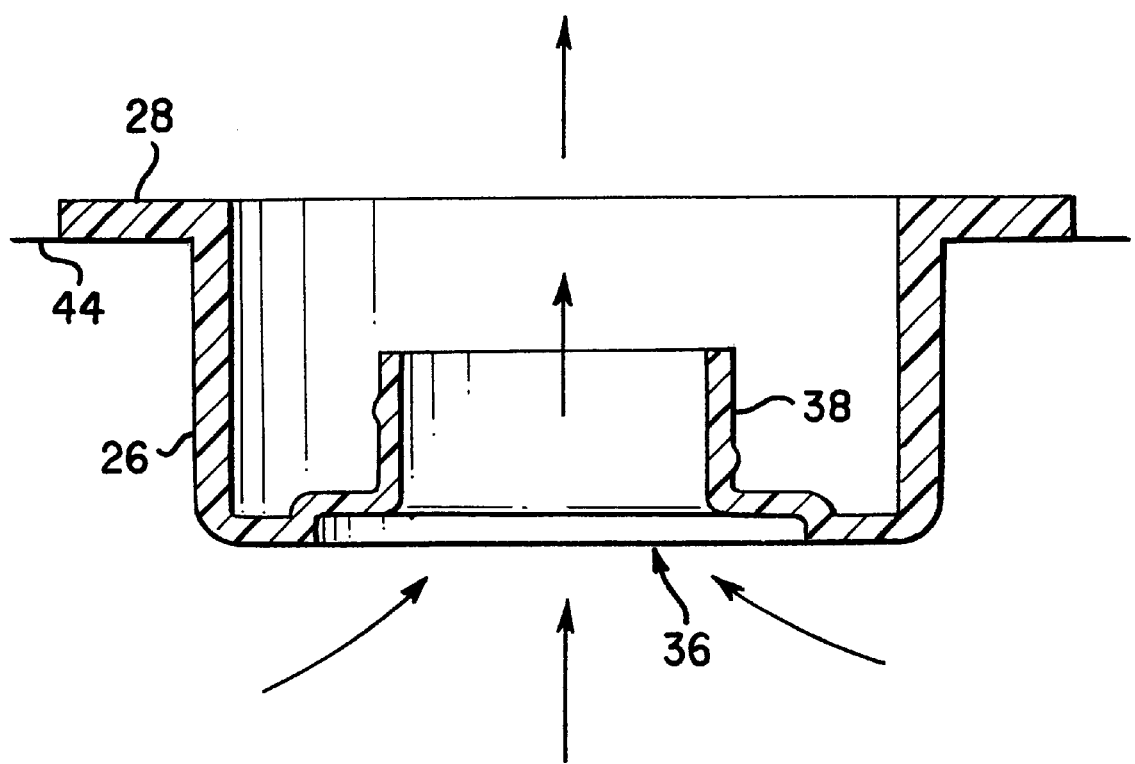
FIG. 5 is a cross-sectional view of the air valve assembly of FIG. 1 shown in use when deflating an inflatable article.

To deflate the article, the cap 20 is disengaged from the wall 38, and the valve body 18 is removed from the valve block 12 by pulling the valve body 18 from the valve block 12. This can be accomplished by gripping and pulling the flap 80. As shown in FIG. 5, air from the interior of the article will then escape through the opening 36 and the interior of the wall 38.

The valve assembly 10 of the present invention provides numerous benefits. First, the combined valve body 18 and air block 14 provides a tight and secure seal against the wall 38 to minimize leakage. The fact that the valve body 18 is provided in a flexible material, and the valve block 12 and air block 14 are provided in rigid materials, promotes this tight seal because the flexible nature of the valve body 18 between the rigid valve block 12 and rigid air block 14 essentially causes the valve body 18 to function as a gasket that provides a tight seal. As a result, the valve assembly 10 avoids the use of additional gaskets or components, thereby simplifying the construction of the valve assembly 10.

Second, the configuration of the valve block 12 allow for the entire valve assembly 10 to be retained in a recess that is essentially defined by the cylindrical body 26 of the valve block 12. As a result, the valve assembly 10 will not protrude from the surface of the inflatable article during use.

Third, the inflation and deflation of the article can be accomplished quickly and conveniently. The valve body 18 (and its retained air block 14 and valve flap 16) is essentially a single valve piece that can be plugged into, or removed from, the wall 38 of the valve block 12 in a quick and convenient manner. In this regard, the convex nature of the disk 54 facilitates the introduction of air into the interior of the article, while allowing for an effective seal against air escaping from the interior of the article. The snap-fit connection between the air block 14 and the valve body 18 further provides a simple yet effective connection that can be accomplished quickly and conveniently by the user.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An air valve assembly, comprising:
   a valve block that is adapted to be permanently secured to an article, the valve block having a passageway through which air can pass;
   a valve body having a wall that defines a through bore, and with the wall having an inner annular indent;
   an air block having an outer wall with a flange provided on the outer wall, the flange being fitted inside the indent to attach the air block inside the through bore of the valve body, the air block further including a plurality of air holes and a central passageway;
   a valve flap having a disk and a shaft inserted through the central passageway of the air block;

wherein the valve body is fitted inside the passageway of the valve block; and a cap that is removably secured to the wall of the valve block.

2. The assembly of claim 1, wherein the air block has a convex disk having a convex surface, with the air holes and central passageway provided in the convex disk, and wherein the disk of the valve flap rests against the convex surface of the convex disk.

3. The assembly of claim 2, wherein the central passageway is provided in a stem that extends from the convex disk, the stem having a top edge, and wherein the valve flap has an enlarged tip that abuts the top edge of the stem.

4. The assembly of claim 1, wherein the wall of the valve block has external threads, and the cap has internal threads that threadably engage the external threads.

5. The assembly of claim 1, wherein the valve block is made from a rigid material.

6. The assembly of claim 1, wherein the valve flap has an enlarged tip which extends outside the central passageway.

7. The assembly of claim 1, wherein the valve body is made from a soft material.

8. The assembly of claim 7, wherein the air block is made from a rigid material.

9. The assembly of claim 1, wherein the valve body is made from a material that is softer than the material of the air block.

10. An air valve assembly, comprising:

a valve block that is adapted to be permanently secured to an article the valve block having a passageway through which air can pass;

a valve body having a wall that defines a through bore and with the wall having an inner annular indent;

an air block having an outer wall with a flange provided on the outer wall the flange being fitted inside the indent to attach the air block inside the through bore of the valve body the air block further including a plurality of air holes and a central passageway;

a valve flap having a disk and a shaft inserted through the central passageway of the air block;

wherein the valve body is fitted inside the passageway of the valve block; and wherein the inner annular indent is a first indent, and wherein the wall of the valve body has a second inner annular indent that receives a portion of the outer wall of the air block.

11. An air valve assembly, comprising:

a valve block that is adapted to be permanently secured to an article the valve block having a passageway through which air can pass;

a valve body having a wall that defines a through bore and with the wall having an inner annular indent;

an air block having an outer wall with a flange provided on the outer wall the flange being fitted inside the indent to attach the air block inside the through bore of the valve body the air block further including a plurality of air holes and a central passageway;

a valve flap having a disk and a shaft inserted through the central passageway of the air block;

wherein the valve body is fitted inside the passageway of the valve block; and wherein the valve block further includes a cylindrical body and an annular flange extending from the cylindrical body, with the annular flange adapted to be permanently secured to an article.

12. An air valve assembly, comprising:

a valve block that is adapted to be permanently secured to an article, the valve block having a passageway through which air can pass;

a valve body having a wall that defines a through bore, and with the wall having a first inner annular indent and a second inner annular indent;

an air block having an outer wall with a flange provided on the outer wall, the flange being fitted inside the first annular indent to attach the air block to the valve body, and a portion of the outer wall of the air block received inside the second inner annular indent, the air block further including a plurality of air holes and a central passageway; and a valve flap having a disk and a shaft inserted through the central passageway of the air block;

wherein the valve body is fitted inside the passageway of the valve block.

13. An air valve assembly, comprising:

a valve block that is adapted to be permanently secured to an article, the valve block having a passageway through which air can pass;

a valve body having a wall that defines a through bore;

an air block having an outer wall that is attached to the through bore of the valve body, the air block further including a plurality of air holes and a central passageway;

a valve flap having a disk and a shaft inserted through the central passageway of the air block;

wherein the valve body is fitted inside the passageway of the valve block; and a cap that is removably secured to the wall of the valve block.

14. The assembly of claim 13, wherein the air block has a convex disk having a convex surface, with the air holes and central passageway provided in the convex disk, and wherein the disk of the valve flap rests against the convex surface of the convex disk.

15. The assembly of claim 14, wherein the central passageway is provided in a stem that extends from the convex disk, the stem having a top edge, and wherein the valve flap has an enlarged tip which abuts the top edge of the stem.

16. The assembly of claim 13, wherein the wall of the valve block has external threads, and the cap has internal threads that threadably engage the external threads.

17. The assembly of claim 14, wherein the valve body is made from a material that is softer than the material of the air block.

* * * * *